United States Patent

[11] 3,544,078

[72] Inventor Yani S. Stupakis
Wilmington, Delaware
[21] Appl. No. 753,314
[22] Filed May 28, 1968
Division of Ser. No. 634,754,
Apr. 28, 1967, now Pat. No.
3,423,028
[45] Patented Dec. 1, 1970
[73] Assignee E. I. du Pont de Nemours and Company,
Wilmington, Delaware
a corporation of Delaware

[54] JET FLUID MIXING PROCESS
4 Claims, 3 Drawing Figs.
[52] U.S. Cl. .................................................... 259/4,
159/4, 159/18; 264/12
[51] Int. Cl. .................................................... B05b 7/04;
B01f 5/02

[50] Field of Search ........................................... 259/4, 18,
36; 159/4(I), 4(B), 18; 264/12; 239/427.3, 427.5

[56] References Cited
UNITED STATES PATENTS
3,233,879 2/1966 Mitchell ........................ 159/18UX Primary Examiner—William I. Price
Attorney—Francis A. Paintin ABSTRACT: A multistage (e.g., seven-stage) jet device for mixing fluids (e.g., steam and polymer solutions) which has a plurality of annular chambers surrounding a central zone, a first set of the chambers having annular orifices for directing thin tubular sheaths of fluid (e.g., polymer solution) down the zone, each of increasing diameter, and alternating therewith along the zone a second set of fluid chambers for directing a second fluid (e.g., steam) in thin sheaths transverse to the tubular sheaths.

INVENTOR
YANI S. STUPAKIS

BY Raymond E. Smislett
ATTORNEY 3,544,078

JET FLUID MIXING PROCESS

BACKGROUND OF THE INVENTION

1. Field of the Invention

This invention relates to mixing fluids and, more particularly, it relates to devices for mixing steam with solutions of elastomeric materials.

2. Description of the Prior Art

Many jet fluid mixing devices are well known in the art. Moreover, the use of such devices to mix steam with solutions of elastomeric polymers is also well known even when employed in the process for isolating a dry elastomer from solutions in organic solvents. However, such devices and processes are very difficult to control and usually are relatively inefficient. Specifically, the atomization of the solution into uniform particles by contacting with steam can provide particles either too large or too small. In the latter case, excessive quantities of steam are expended for each pound of elastomer isolated and the material is often so fine that it is carried away with the solvent vapors and is very difficult to recover. Oversized solvent-swollen elastomer particles are difficult to dry and also tend to cling to the internal surfaces of the jet and foul the apparatus after a short duration, thus disrupting the process. Another difficulty with many prior art devices is encountered in attempting to scale them up in size for large-volume production.

SUMMARY OF THE INVENTION

A jet device is provided which is uniquely suitable for mixing fluids according to the novel process of this invention, which device comprises (a) a plurality of annular chambers surrounding a central zone and arranged along the length thereof, (b) a first set of said chambers alternating along said length with a second set of chambers, (c) said first set being connected to a first fluid supply conduit, (d) said second set being connected to a second fluid supply conduit, (e) each chamber of said first set having an annular orifice for directing said first fluid in a thin-walled tubular sheath along the length of said central zone, (f) each chamber of said second set having an annular orifice for directing said second fluid in a thin-walled sheath directed toward the central zone, which sheath intersects the tubular sheath of an adjacent chamber of the first set.

DESCRIPTION OF PREFERRED EMBODIMENTS

Figure 1:
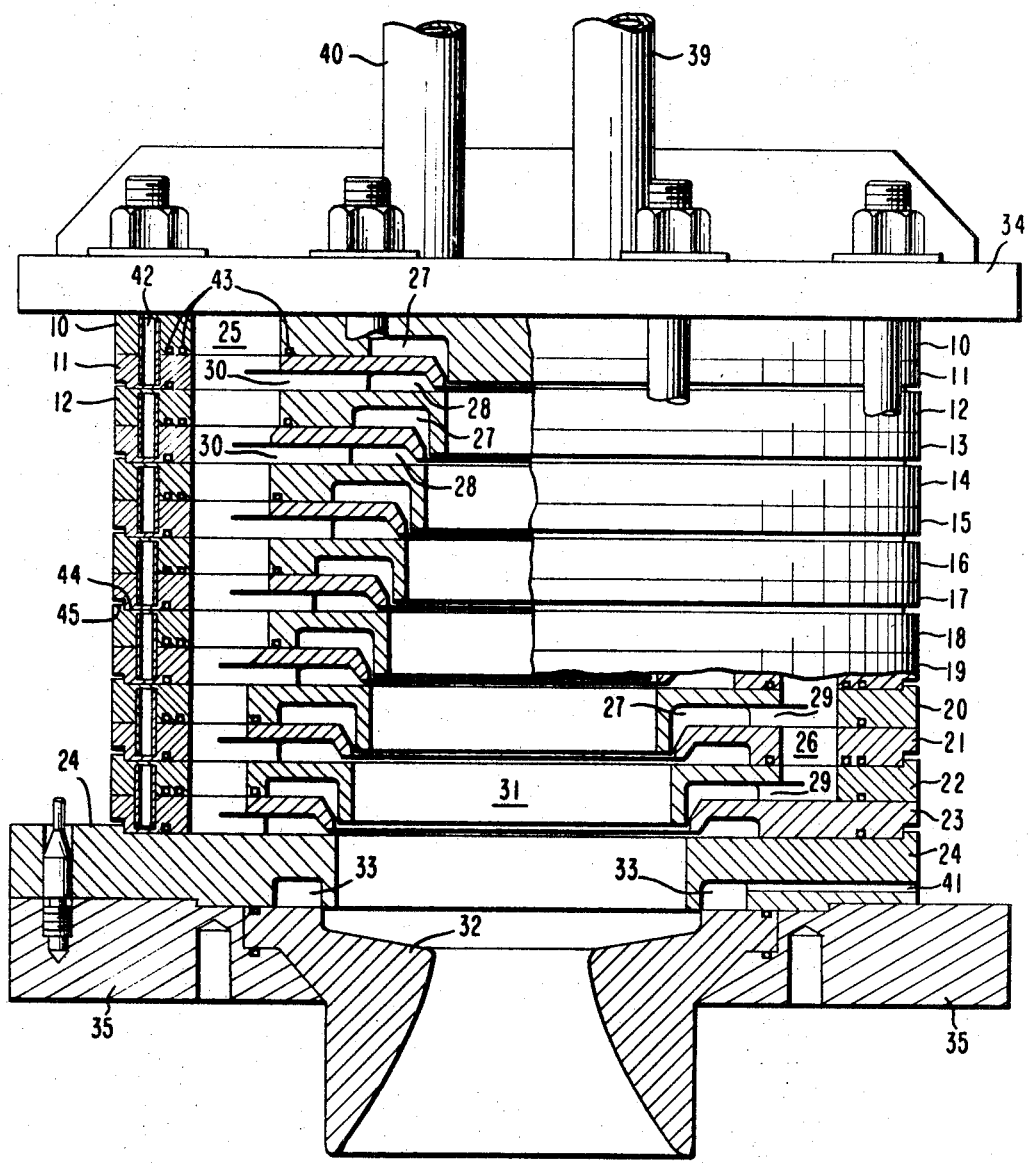
FIG. 1 illustrates an elevational view of a jet device of this invention partially in section. The sectional portion is purposely distorted to show conduits 25 and 26 as being 180° apart, whereas they are, in fact, about 45° apart as can be seen in FIG. 2.
Figure 2:
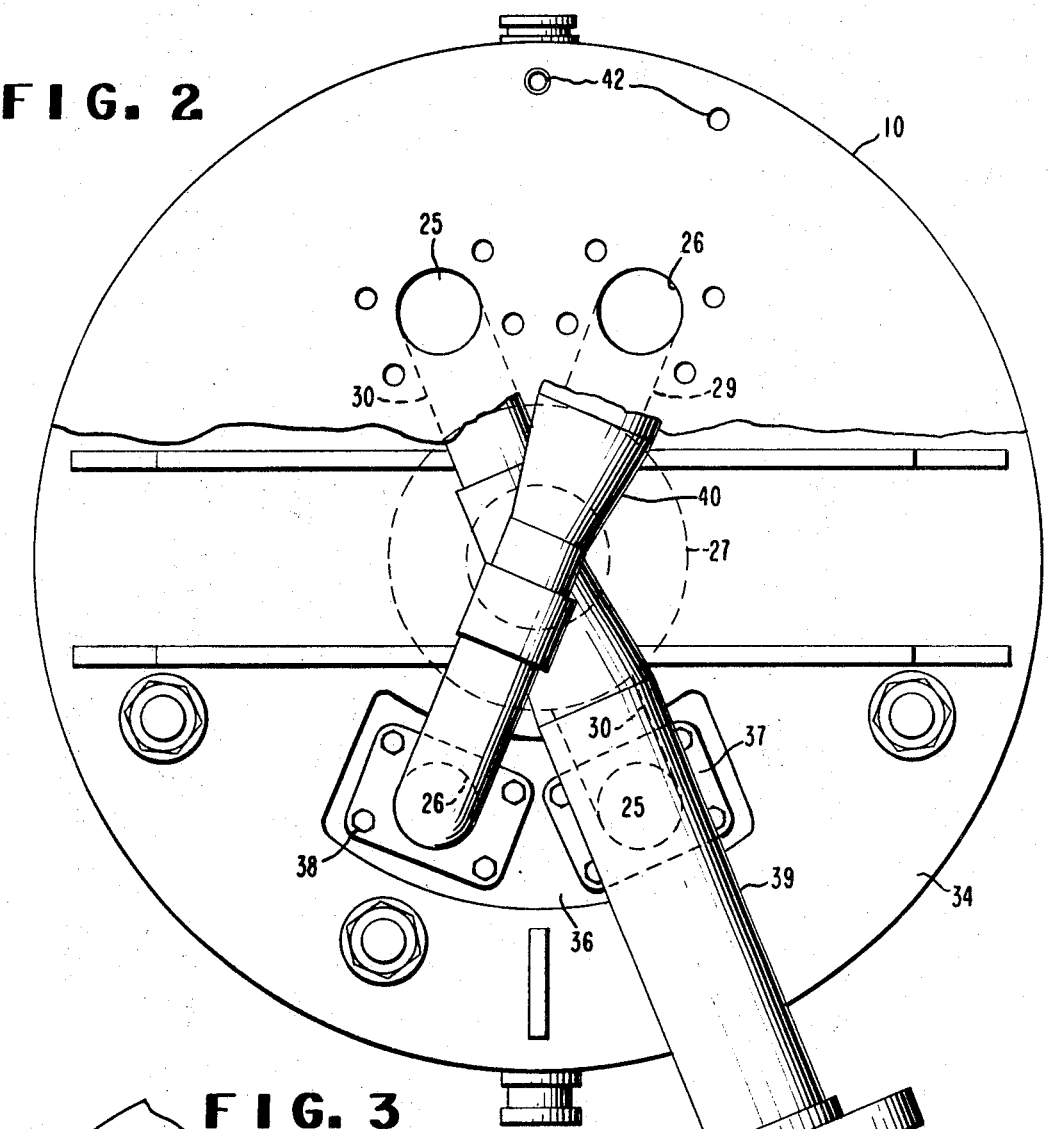
FIG. 2 is a plan view of the jet device with the upper portion of the cover plate 34 broken away to show a plan view of a portion of plate 10.
Figure 3:
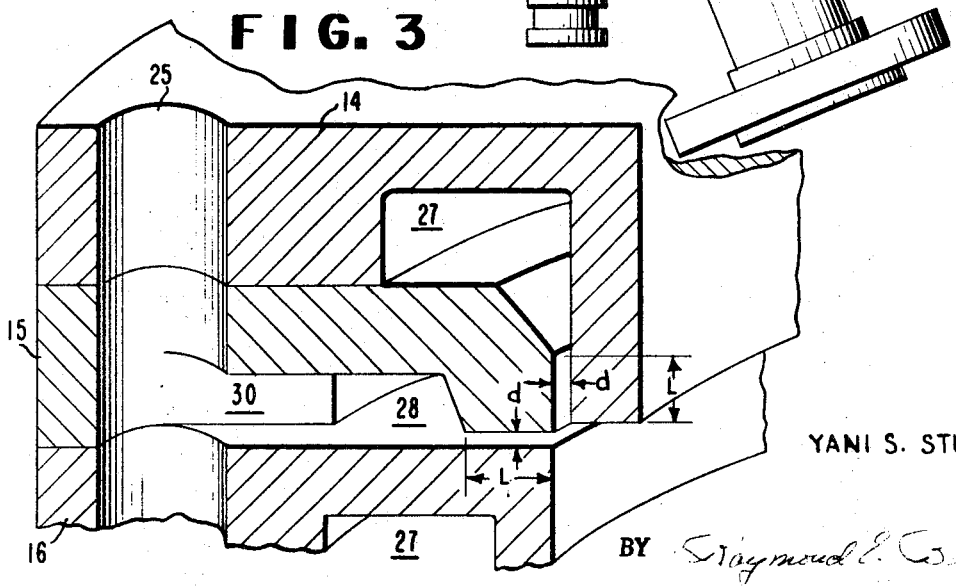
FIG. 3 is an enlarged fragmentary isometric view in section to illustrate the details of the annular chambers and slots to be described hereinafter.

The drawings illustrate a particularly preferred jet device according to this invention. The body of the device is made up of a series of disklike plates 10 through 24. Each (except for disk 24) has four holes therein, which when assembled form two pairs of conduits 25 and 26. Each plate (except for 24) also has an annular groove or channel which when assembled with the adjacent plates forms alternate annular chambers 27 and 28 which have orifices of width $d$ and length L as shown in FIG. 3. The chambers 27 of disks 10, 12, 14, etc. are all in communication with conduits 26 by means of slot passages 29 which are a pair of radial grooves in the disks 10, 12, 14, etc. leading to the conduit holes. disks 11, 13, 15, etc. likewise have radial slot passages 30 which lead from conduits 25 to chambers 28.

Disks 11 through 24 each have a central hole which, when the jet is assembled, form the central zone 31, the hole in each successive disk being of greater diameter so that zone 31 enlarges toward its effluent end.

Disk 24 has an annular groove which when assembled with convergent-divergent nozzle 32 forms an annular chamber 33.

The disks of the jet device are covered with end plates 34 and 35 which are conventionally bolted as shown. End plate 34 has a pair of apertures 36 therein which permits the flanges 37 and 38 of fluid supply pipes 39 and 40 to be bolted directly to plate 10. Note that supply pipes 39 and 40, as well as conduits 25 and 26, are gradually diminished in cross section to avoid the pressure drop due to the fluid flow pattern.

In the operation of the device, a fluid is introduced under pressure through supply pipe 40 into conduits 26 which flows through the slot passages 29 into annular chambers 27. A series of tubular sheaths emerges from these orifices concentric with the axis of the central zone 31, each successive chamber forming a concentric tubular sheath of increased diameter. Another fluid is introduced through supply pipe 39 into conduits 25 and flows through slot passageways 30 into annular chambers 28. The fluid in these chambers emerges therefrom in a thin, disklike sheath or sheet transverse to the tubular sheaths produced by the other orifices. The intersection of the two fluid sheaths occurs at the orifices and, in the device illustrated, the intersection is at right angles. A third fluid can be introduced into chamber 33 through inlet 41 producing a sheath directed toward the convergent-divergent nozzle 32.

While atomization efficiency improves with thinner fluid sheaths, the throughput of the orifices having very small gaps may be so low as to be economically unattractive and be subject to blockage which can become a serious maintenance problem. Referring particularly to FIG. 3, it is found that best results are obtained when the orifice gap $d$ is between about 0.01 and 0.05 inch, preferable 0.02 inch. The optimum length L of the orifice passageway is between about 0.01 to 0.1 inch. Since the viscosity of the solution may be reduced in traveling through a constricted passageway, an extra long length orifice might further reduce the viscosity and thus require less energy for its disintegration. However, the accompanying pressure drop in the passageway may become excessive at lengths over about 0.2 inch. Preferably, the $L/d$ ratio is between about 4 and 12.

In view of the above, it is apparent that the assembly of the disks to form the jet device must be done with precision. This is accomplished by assembling the disks in pairs, e.g. 10 and 11, 12 and 13, etc. Each pair has a plurality of dowel pins 42 to match the engagement of the disks accurately; gaskets 43 are provided as shown in the drawing to form a fluid-type seal between the disks. The top and bottom faces of each pair are modified by a raised circular shoulder 44 and a matching recess 45. These interfit with each other and facilitate alinement and assembly. The assembly depicted in the drawings is referred to as a seven-stage jet since seven tubular sheaths of fluid from chambers 27 are intersected by seven disk-shaped sheets of fluid from chambers 28 to effect atomization in the central zone. More or fewer stages can be employed as indicated by the particular application.

The invention will now be described with reference to specific operating conditions with a specific jet device.

The jet device is assembled as depicted in the drawings with the orifices formed by plates 10 and 11 being about 4 inches in diameter and the orifices formed by plates 22 and 23 being about 9 inches in diameter, the thickness of each pair of disks, such as 10 and 11, being about 2 inches. The convergent-divergent nozzle 32 has an aperture about 4.1 inches in diameter with a convergent distance of about 1.2 inches in diameter and a total length of about 6.5 inches. Conduits 25 and 26 are about 2.25 inches in diameter at the top, 2 inches in diameter in the middle, and about 1.5 inches in diameter at the bottom. For the orifices, $d$ is 0.020 inches and L is 0.200 inch.

The device will be used to atomize, with steam, a solution of approximately 5 weight percent of elastomer in tetrachloroethylene. The elastomer is a terpolymer of ethylene, propylene and 1,4-hexadiene (generally prepared as described in U.S. Pat. No. 2,933,480) having a Mooney viscosity of about 70 (ML-4/250° F.) and an inherent viscosity of about 2.7 (measured at 30+ C. on a solution of 0.1 g. polymer in 100 ml. of tetrachloroethylene). About 70,000 pounds per hour of solution are delivered to the jet through pipe 40 and into conduits 26. Approximately 10 to 11 pounds of steam per pound of dry polymer are delivered to the jet through pipe 39 leading into conduits 25. The polymer solution is fed at about 100° C. and 70 p.s.i.g. The steam is saturated at about 150 p.s.i.g. About 5,000 pounds per hour of water are introduced through 41 into annular chamber 33. The water is at a temperature of about 80° C. and a pressure of about 70 p.s.i.g. The polymer solution droplets emerging from nozzle 32 typically show a reduction in solvent concentration from 95 percent down to about 50 percent. It should be clear that the jet device of this invention does not, and is not expected to, effect complete solvent removal. The effluent from the nozzle is fed through a stripping tube into a flash chamber for solvent and steam removal and the concentrated polymer solution, which is now in the form of a solvent-swollen crumb, is then fed to two or more vessels in series wherein it is contacted with steam and boiling water and dried to reduce the solvent content to below about 1 percent. This latter operation per se forms no part of this invention and is described in detail in copending U.S. Pat. application Violette & Wieland, Ser. No. 634,753, filed concurrently herewith.

In the isolation of the polymer from solvent solutions, there are two primary objectives: (1) the creation of small droplets of solution to create a large surface area for evaporation, and (2) the introduction of as much heat as possible into the droplets to serve as a driving force for the evaporation. In using a plurality of stages, a number of things are accomplished. First, the solution comes out in an extremely thin sheath and it is impinged upon by a transverse sheath of steam. The use of a plurality of stages concentrically arranged also enables the first sheath of polymer solution, which comes out and is impinged upon by the first steam stage, to be repetitively hit by the successive steam stages as it proceeds down the elongated central zone. If there is no restrictive orifice on the device, the steam particles and the particles of solution soon acquire the same velocity. This means that the only driving force for the evaporation of the solvent from the solution droplets is diffusion. By adding a restrictive opening whose open area is only slightly greater than the total area of all fluid orifices, a source of turbulence is introduced. This then creates a convective heat transfer atmosphere which is the predominant force in the evaporation of the solvent from the solution droplets. The solution as it is introduced into the device is only about 5 percent polymer; however, as it proceeds down the central zone, solvent is evaporated from the droplets producing higher polymer concentrations. These droplets can be rather tacky particles which would tend to build up on the surface of the restrictive opening. For this reason, the water wash stage is provided to constantly flush down the restrictive opening so that this buildup is avoided.

This device provides highly improved atomization and heat transfer between the steam and polymer solution using the maximum kinetic energy of the fluids to achieve atomization. It is uniquely suited to transform the shape of a mass of fluid into a configuration having high surface area, low resistance to shear and reduced viscosity. Moreover, the device possesses all these advantages and is still capable of handling very large quantities of fluids and subjecting them to turbulent mixing.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

I claim:

1. In a process for mixing fluids into a central zone, the steps of (1) directing a first fluid in a plurality of thin-walled tubular sheaths along the length of said zone, (2) directing, transverse to the first fluid, a second fluid in a plurality of thin-walled sheaths surrounding a said zone and successively arranged along its length, (3) each first fluid sheath being intersected in said zone by a second fluid sheath.

2. A process as defined in claim 1 wherein the effluent from said central zone is restricted to create turbulence in the effluent fluids.

3. A process as defined in claim 2 wherein a third fluid sheath is directed toward the restricted end of said central zone.

4. A process as defined in claim 3 wherein said first fluid is an organic solvent solution of an elastomer, said second fluid is steam, and said third fluid is water.